United States Patent
Gillespie et al.

(10) Patent No.: US 7,574,993 B2
(45) Date of Patent: Aug. 18, 2009

(54) APPARATUS, SYSTEM AND METHOD FOR OPERATING A DUAL FUELED SPARK IGNITION ENGINE

(76) Inventors: Donald E. Gillespie, 4629 Platt Rd., Ann Arbor, MI (US) 48108; Shawn Grannell, 1697 Cram Cir. #3, Ann Arbor, MI (US) 48105

( * ) Notice: Subject to any disclaimer, the term of this patent is extended or adjusted under 35 U.S.C. 154(b) by 12 days.

(21) Appl. No.: 11/934,651

(22) Filed: Nov. 2, 2007

(65) Prior Publication Data

US 2009/0118973 A1    May 7, 2009

(51) Int. Cl.
*F02M 1/00*    (2006.01)
*F02P 5/00*    (2006.01)

(52) U.S. Cl. .................. 123/434; 123/406.23; 123/698; 123/699

(58) Field of Classification Search .................. 123/304, 123/406.11, 406.23, 406.24, 406.45, 434, 123/681, 682, 687, 698, 699, 700
See application file for complete search history.

(56) References Cited

U.S. PATENT DOCUMENTS

| | | | |
|---|---|---|---|
| 3,150,645 A | | 9/1964 | Mrstik et al. |
| 4,201,553 A | * | 5/1980 | Osborg .......................... 44/314 |
| 4,502,453 A | | 3/1985 | Kabasin et al. |
| 4,750,453 A | * | 6/1988 | Valdespino .................... 123/3 |
| 5,379,740 A | | 1/1995 | Moore et al. |
| 5,775,309 A | | 7/1998 | Burrahm |
| 6,003,478 A | | 12/1999 | Huber |
| 6,073,592 A | | 6/2000 | Brown et al. |
| 6,202,601 B1 | | 3/2001 | Ouellette et al. |

(Continued)

OTHER PUBLICATIONS

Phillip Proefrock, New Alternative Fuel Vehicle, http://greenoptions.com/2007/08/08/new_alternative_fuel_vehicle Aug. 2008.

(Continued)

*Primary Examiner*—John T Kwon
(74) *Attorney, Agent, or Firm*—Kunzler & McKenzie

(57) ABSTRACT

Described herein are various embodiments of an apparatus, system and method for operating a dual fueled spark ignition engine. For example, according to one illustrative embodiment, a method for operating a dual fueled spark ignition engine includes fueling the engine solely with a combustion promoter within a first engine load range between zero and an engine load associated with a target combustion condition selected from the group consisting of rough limit, knock limit, and any of various conditions between the rough limit and knock limit. Within the first engine load range, the amount of combustion promoter fueling the engine increases as the load increases. The method further includes fueling the engine on a mixture of ammonia and the combustion promoter within a second engine load range between the engine load associated with the selected target combustion condition and the engine load associated with a maximum operating pressure of the engine. Within the second engine load range, the amount of ammonia fueling the engine increases and the amount of combustion promoter fueling the engine remains substantially constant as the load increases.

25 Claims, 6 Drawing Sheets

U.S. PATENT DOCUMENTS

| | | |
|---|---|---|
| 6,276,345 B1 | 8/2001 | Nelson et al. |
| 6,382,182 B1 | 5/2002 | Green et al. |
| 6,550,430 B2 | 4/2003 | Gray |
| 6,561,157 B2 * | 5/2003 | zur Loye et al. ............ 123/295 |
| 6,575,147 B2 | 6/2003 | Wulff et al. |
| 6,684,849 B2 * | 2/2004 | zur Loye et al. ............ 123/295 |
| 7,019,626 B1 | 3/2006 | Funk |
| 7,055,506 B2 | 6/2006 | Kaiser et al. |
| 7,228,841 B2 | 6/2007 | Takemoto et al. |
| 7,258,090 B2 | 8/2007 | Kawasaki |
| 7,270,089 B2 | 9/2007 | Wong |
| 2002/0134362 A1 * | 9/2002 | Deutsch ..................... 123/575 |
| 2003/0164162 A1 | 9/2003 | Vinyard |
| 2004/0149255 A1 * | 8/2004 | zur Loye et al. ............ 123/295 |

OTHER PUBLICATIONS

The Ammonia Fuel Conference, FINDS A Strokes Engineering Publication, vol. 21, No. 4, Fourth Quarter 2006.

John Camp, Todd Rachel, Closed-Loop Electronic Fuel and Air Control of Internal Combustion Engines, Society of Automotive Engineers, Automotive Engineering congress & Exposition, Detroit, Michigan, Feb. 24-28, 1975.

R.Shand et al., Experimental Development of an Ammonia Fueled Engine, Industrial Technology Centre/Manitoba Research Douncil, Revision 1, May 10, 1985. pp. 5-9 and 14.

* cited by examiner

APPARATUS, SYSTEM AND METHOD FOR OPERATING A DUAL FUELED SPARK IGNITION ENGINE

FIELD

The present disclosure relates to the operation of an internal combustion engine capable of running on dual fuels, and more particularly to the operation of a spark ignition engine capable of running on ammonia and a combustion promoter.

BACKGROUND

Due at least in part to high crude oil prices, environmental concerns, and future availability, many internal combustion engine designers have looked to at least partially replace crude oil fossil fuels, e.g., gasoline and diesel, with so-called alternative fuels for powering internal combustions engines. Desirably, by replacing or reducing the use of fossil fuels with alternative fuels, the cost of fueling internal combustion engines is decreased, harmful environmental pollutants are decreased, and/or the future availability of fuels is increased.

One known alternative fuel is electricity. Many gasoline/electric powered hybrid vehicles and electric powered vehicles are known in the art. Electricity may be desirable as an alternative fuel because its use in powering an engine does not produce harmful exhaust emissions. Notwithstanding its advantages, electricity as a long-term partial or complete replacement of fossil fuels is unrealistic. For example, in order to replace the consumption of fossil fuels in vehicular internal combustion engines within the United States, 1 terawatt of electricity would be required. To meet the demands of 1 terawatt of electricity for powering automobiles, the current electricity output of the United States would need to be substantially increased. For various reasons, such as cost, such an increase is not physically and economically feasible. Also, the large batteries that typically power electric cars add significant weight to the vehicle, which affects the overall fuel economy of the vehicle. The range of electric cars can also be limited by the size and types of batteries used. Finally, the energy storage density of batteries is significantly lower than other alternative fuels, specifically ammonia. For at least the foregoing reasons, electricity is not a practical alternative fuel for replacing or supplementing crude oil fossil fuels for the powering of automobiles or other machines using internal combustion engines.

Another known alternative fuel is hydrogen. Unlike electricity, the United States possesses the capability of producing sufficient quantities of hydrogen to replace fossil fuels. Hydrogen can be produced using nuclear energy and renewable energy sources, such as wind and water, such that the production and use of hydrogen does not emit harmful carbon emissions to the environment.

Although hydrogen can be readily produced, its use as an alternative fuel has several drawbacks. For example, hydrogen has a low energy density by volume. For example, the energy density of hydrogen at 3,300 psi is about 7% of the energy density of gasoline. To travel the same distance on hydrogen compared to gasoline, the hydrogen tank would need to be approximately 14 times larger than most current gas tanks. Accordingly, vehicles operating on hydrogen would require storage tanks that are significantly larger than gasoline tanks. Further, hydrogen must be stored at high pressures, such as 10,000 psi, which can be relatively unsafe for distribution, handling and use. Additionally, tanks suitable for storing hydrogen at 10,000 psi must be very strong, such as 70 times stronger than ammonia storage tanks, and thus would be very expensive to manufacture. Hydrogen also is relatively explosive, which increases the danger associated with the distribution, handling and use of hydrogen.

Another known shortcoming with hydrogen as an alternative fuel is that the mass distribution of hydrogen to refueling centers across large geographical areas, such as the United States, is unfeasible. Hydrogen gas cannot be distributed using current pipelines used for distributing petroleum. Therefore, the only alternative would be to distribute the hydrogen by commercial trucking and railcar, which would result in a significant increase in the number of commercial trucks and railcars currently in use and thereby increase the overall energy required to distribute the hydrogen. Further, because hydrogen has a much lower energy density volume than gasoline, more hydrogen per volume would be needed at gas stations. Based on the storage capacity of current gas station storage tanks, the tanks would require more frequent refilling if hydrogen were stored instead of gasoline. Typically, gas stations are refilled with gasoline about once a day. In contrast, with hydrogen, stations would require refilling at least 12-15 times a day. Additionally, to decrease its volume, hydrogen may be stored as a cryogenic liquid. Accordingly, extra energy must be used to continually refrigerate the hydrogen liquid. Therefore, the storage of hydrogen as a liquid raises cryogenic concerns and wastes precious energy to store the hydrogen as a liquid. For at least these reasons, hydrogen is not a feasible alternative fuel for replacing or supplementing fossil fuels in powering internal combustion engines.

Yet other known alternative fuels are natural gas and propane. Although future quantities of natural gas and propane will be more readily available than other fossil fuels, such as crude oil, natural gas or propane as a fuel for powering internal combustion engines has several shortcomings. For example, natural gas and propane are fossil fuels and thus produce harmful carbon emissions and prices are forecast to dramatically increase along with petroleum. Also, the mass distribution problems associated with hydrogen are similar to the mass distribution problems of natural gas. Therefore, for at least these reasons, natural gas and propane are not feasible fuel alternatives for replacing or supplementing crude oil fossil fuels in powering internal combustion engines on a broad scale.

Hydrazine is another known alternative fuel capable of replacing or at least partially replacing crude oil fossil fuels. Hydrazine ($N_2H_4$) is a chemical compound widely used in rocket fuel. Although combustion of hydrazine produces no carbon emissions, is readily producible, has long-term availability, and is highly combustible, hydrazine has several drawbacks. For example, hydrazine is highly reactive, flammable and toxic. Accordingly, hydrazine is difficult to transport and handle and thus is not a feasible alternative to crude oil fossil fuels.

Ammonia is yet another known alternative fuel capable of replacing or at least partially replacing crude oil fossil fuels. Ammonia ($NH_3$) is widely used in household cleaning supplies and agricultural fertilizer. Although liquid ammonia can cause injury if improperly used, such as being brought into contact with the skin or eyes, swallowed or inhaled, it is much less toxic and less dangerous to handle than many other alternative fuels. For example, unlike hydrogen, ammonia need not be stored under extreme pressures to maintain the ammonia at a usable energy density. Ammonia is currently manufactured and transported in mass quantities. Presently, ammonia is at least the fourth most transported commodity in the United States and costs less than gasoline, e.g., the cost of ammonia is less than that of gasoline per unit energy. Ammonia can be stored indefinitely as a liquid in a low pressure environment. Accordingly, ammonia can be transported via currently available high pressure pipelines. Therefore, the manufacture, handling and distribution of ammonia are more feasible than other known alternative fuels.

The energy density of ammonia at 150 psi is about 40% of the energy density of gasoline. In contrast to hydrogen, the ammonia tank need only be 2.4 times larger the gasoline tank to travel the same distance on ammonia as on gasoline. Further, if ammonia were distributed by current gas stations, the ammonia would have to be refilled only twice a day compared to 12-15 times per day as would be required for hydrogen.

Because ammonia does not contain carbon, the combustion of ammonia does not result in greenhouse gas, $CO$, $CO_2$ or carbon particulate pollution emissions into the environment. More specifically, the byproducts of complete combustion of ammonia are relatively innocuous pure water and nitrogen. Further, ammonia can be readily manufactured using carbon-free energy sources, such as nuclear energy. Therefore, in some practical instances, little to no environmentally dangerous emissions are generated in the manufacture and combustion of ammonia.

Many ammonia-fueled internal combustion engines known in the art, however, suffer from one or more shortcomings. For example, ammonia has a slower flame speed, is more difficult to ignite, has a higher auto ignition temperature, and is less flammable than gasoline and many other alternative fuels, such as hydrogen. Some internal combustion engines use high compression ratios and supercharging to improve the combustibility of ammonia at high engine loads. However, at low engine loads, such as during idling of the engine, the combustibility of ammonia is incomplete and the performance of the engine suffers.

Some ammonia-fueled internal combustion engines known in the art use a combustion promoter to promote the combustion of the ammonia. These engines do not control or alter the ratio of ammonia to combustion promoter as the engine load and/or RPM changes to achieve stoichiometric operation of the engine. For example, many conventional ammonia-fueled engines do not use a closed loop control to adjust the amount of ammonia combusted in the engine based on one or more operating conditions during operation of the engine. Further, some conventional engines do not operate at, or are not concerned with the benefits of operating at, specific combustion conditions, such as rough limit, knock limit, or any particular condition between the rough and knock limits.

Based on the foregoing, there is a need for a spark ignited internal combustion engine capable of stoichiometric operation on ammonia and a combustion promoter throughout the entire range of engine loads and RPM.

SUMMARY

The subject matter of the present disclosure has been developed in response to the present state of the art, and in particular, in response to the problems and needs in the art that have not yet been fully solved by currently available internal combustion engines. Accordingly, described herein are embodiments of an apparatus, system and method for operating a dual fueled spark ignition engine that overcome at least one of the above-discussed or other shortcomings in the art. For example, according to some embodiments, an apparatus, system and method of operating a dual fueled spark ignition engine is disclosed that, among other things, allows stoichiometric operation of the engine throughout the entire range of engine loads and RPM of the engine. Generally, stoichiometric operation of the engine promotes an optimum balance between power and efficiency. Further, as described herein and according to some implementations, an apparatus, system and method of operating an engine on ammonia and a combustion promoter that may allow knock-free operation at higher compression ratios and higher loads than could be obtained using a combustion promoter alone.

According to one representative embodiment, a dual fueled spark ignition internal combustion engine includes an engine intake line that is coupled to at least one combustion chamber. The engine can further include an air intake system that is in air supplying communication with the engine intake line. Additionally, the engine includes a fuel delivery system that includes a first ammonia source and a second combustion promoter source separate from the first ammonia source. The first ammonia source is communicable in ammonia supplying communication with the engine intake line and the second combustion promoter source is communicable in combustion promoter supplying communication with the engine intake line. The engine also includes an electronic control module that is operable in a dual fuel mode to control the flow rate of ammonia and combustion promoter into the engine intake line to achieve substantially stoichiometric combustion of air, ammonia and combustion promoter in the combustion chamber for each cycle of the internal combustion engine. When in the dual fuel mode, the per cycle ratio of ammonia to combustion promoter combusted in the combustion chamber is controlled to increase as the engine load increases. In some implementations, the ammonia source is an ammonia container and the combustion promoter is a combustion promoter container.

In some instances, a predetermined amount of combustion promoter sufficient for efficient operation and minimal power loss is used. Additionally, in some implementations, the transition along the operating range of the engine and corresponding changes in the fuel ammonia to combustion promoter ratios is seamless, such as without operator input or recognition of the transition.

In some implementations, the electronic control module is operable to control the flow rate of ammonia and combustion promoter into the engine intake to operate the engine at a desired operational state between a rough limit and a knock limit. The ratio of ammonia to combustion promoter at the rough limit is higher than the ratio of ammonia to combustion promoter at the knock limit at a given engine load.

According to some implementations, as the engine load increases, the amount of combustion promoter combusted in the combustion chamber remains substantially constant, and the amount of ammonia combusted in the combustion chamber increases per engine cycle. In certain implementations, an exhaust gas oxygen sensor is electrically coupled to the electronic control module. The amount of ammonia combusted in the combustion chamber may be at least partially determined by the net balance between the oxidizer and reducer in the exhaust gas as sensed by the exhaust gas oxygen sensor.

According to some implementations, the electronic control module is operable to control a combustion spark advance of the internal combustion engine. When the ratio of ammonia to combustion promoter is greater than zero, the spark advance may be held substantially constant as the operation load of the engine increases.

In some implementations, the electronic control module is operable in a single fuel mode to reduce the flow rate of ammonia to zero to achieve substantially stoichiometric combustion of only air and combustion promoter in the combustion chamber per cycle at each operating load of the internal combustion engine. The maximum operating load of the engine in the dual fuel mode may be higher than the maximum operating load of the engine in the single fuel mode.

In certain implementations, the engine is operable at a dual fuel knock-limited maximum engine load that is higher than a single fuel knock-limited maximum engine load achieved by operating the engine solely on the combustion promoter.

In some implementations, the engine is operable at a dual fuel engine operating efficiency per cycle at a given load. The dual fuel engine operating efficiency may be higher than a single fuel engine operating efficiency achieved by operating the engine solely on the combustion promoter.

In yet some implementations, the engine is operable to produce a dual fuel maximum exhaust gas temperature at a given load. The dual fuel maximum exhaust gas temperature at a given load may be lower than a single fuel maximum exhaust gas temperature at the given load produced by operating the engine solely on the combustion promoter.

According to one particular implementation, the desired operational state of the engine is at least partially determined by at least one factor selected from the group consisting of operator desire, cost of ammonia, cost of combustion promoter, availability of ammonia, availability of combustion promoter, and overall engine efficiency. In yet another particular implementation, the combustion promoter is selected from the group consisting of renewable fuels and fossil fuels. Also, in one particular implementation, the combustion promoter is selected from the group consisting of gasoline, carbon bearing or hydrocarbon fuels, and hydrogen. In a specific instance, the combustion promoter is gasoline.

The engine can have any of various compression ratios. In one instance, the compression ratio of the engine is greater than about 8:1, such as between about 8:1 and about 12:1. In other instances, the compression ratio is greater than about 10:1, such as between about 10:1 and about 12:1. Further, in some implementations, the combustion promoter is selected from the group consisting of gasoline and other hydrocarbons. The amount of harmful exhaust emission produced by the engine in the dual fuel mode are lower than the harmful exhaust emissions produced by the engine if fueled solely with the combustion promoter.

According to another representative embodiment, an internal combustion engine system includes a spark ignition internal combustion engine, a fuel metering module, an air metering module, and a spark advance module. The spark ignition internal combustion engine is operable at any of various combustion conditions between a rough limit and a knock limit in a single fuel mode and a dual fuel mode. In the single fuel mode the fuel is a combustion promoter. In the dual fuel mode, the fuel is a mixture of ammonia and combustion promoter. The fuel metering module is operable to control the flow rate of ammonia and the flow rate of combustion promoter into the engine such that the mixture of ammonia and combustion promoter has a calculated ratio of ammonia to combustion promoter that is determinable from an operating map of the engine. The fuel metering module is further operable to increase the ratio of ammonia to combustion promoter of the mixture as the engine load increases and decrease the ratio of ammonia to combustion promoter of the mixture as the engine load decreases. In this manner, the fuel metering module is operable to maintain substantially stoichiometric operation across the entire engine load range of the internal combustion engine. The air metering module is operable to control the mass flow rate of air into the engine. The spark advance module is operable to control the spark advance of an ignition spark for igniting the fuel. For a given RPM, the engine automatically switches from the single fuel mode to the dual fuel mode when an engine load corresponding to a target combustion condition is reached.

In some implementations, the fuel metering module is operable to control the mass flow rate of air such that the mass flow rate increases substantially proportionally with increasing engine load and decreases substantially proportionally with decreasing engine load. In yet some implementations, the fuel metering module is operable to hold the flow rate of combustion promoter substantially constant for a given RPM of the engine. The dual fuel mode can be further operable to increase the flow rate of ammonia into the engine as the engine load increases and decrease the flow rate of ammonia into the engine as the engine load decreases.

According to some implementations, when in the dual fuel mode, the spark advance module is operable to increase or hold the spark advance substantially constant as the engine load increases.

In some implementations, there is a first difference between the engine load at which the engine operating at a first compression ratio and the rough limit switches between the single fuel mode and the dual fuel mode and the engine load at which the engine operating at a second compression different than the first compression ratio and the rough limit. There also may a second difference between the engine load at which the engine operating at the first compression ratio and the knock limit switches between the single fuel mode and the dual fuel mode and the engine load at which the engine operating at the second compression ratio and the knock limit switches between the single fuel mode and the dual fuel mode. In some instances, the first difference may be less than the second difference.

Further, in some implementations, as the RPM of the engine increases when operating at the rough limit in the dual fuel mode, the fuel metering module is operable to decrease the ammonia to combustion promoter ratio of the mixture by increasing the flow rate of combustion promoter into the engine on a per cycle basis. The rough limit may correspond to a coefficient of variation of a net indicated mean effective pressure of the engine of less than about 5%, and in some instances, less than about 3%.

According to another embodiment, a method for operating a dual fueled spark ignition engine includes fueling the engine solely with a combustion promoter within a first engine load range between zero and an engine load associated with a target combustion condition selected from the group consisting of rough limit, knock limit, and any of various conditions between the rough limit and knock limit. Within the first engine load range, the amount of combustion promoter fueling the engine increases as the load increases. The method further includes fueling the engine on a mixture of ammonia and the combustion promoter within a second engine load range between the engine load associated with the selected target combustion condition and the engine load associated with a maximum operating pressure of the engine. Within the second engine load range, the amount of ammonia fueling the engine increases and the amount of combustion promoter fueling the engine remains substantially constant as the load increases.

Fueling the engine on a mixture of ammonia and the combustion promoter may include introducing the ammonia into the engine from a first ammonia source and introducing the combustion promoter into the engine from a second combustion promoter source separate from the first ammonia source. The introduction of ammonia into the engine may be separate from the introduction of the combustion promoter into the engine. In some instances, the ammonia and combustion promoter are metered into the engine at a variable ratio to maintain steady firing and acceptable combustion stability.

In some implementations, the method also includes decreasing a spark advance of the engine as the load increases within the first engine load range. In yet some implementations, the method also includes holding the spark advance of the engine substantially constant as the load increases within a substantial portion of the second engine load range.

According to some implementations, fueling the engine on a mixture of ammonia and the combustion promoter includes stoichiometrically combusting the mixture of ammonia and the combustion promoter.

According to yet some implementations, the target combustion condition is the rough limit. The rough limit is reached at a predetermined engine load that increases as the RPM of the engine increases. The target combustion condition may be manually selected.

In certain implementations, the ratio of ammonia to combustion promoter of the mixture at the rough limit is higher than the ratio of ammonia to combustion promoter of the mixture at the knock limit.

In some implementations, the method further includes introducing air into the engine for combustion at a mass flow rate that increases as the load increases from zero load to the maximum engine load of the engine.

According to some aspects of the embodiment, the combustion promoter can be hydrogen.

In certain implementations, the spark ignition engine includes an exhaust gas oxygen sensor that is coupled to an exhaust system of the engine. The method may include controlling the flow rate of the combustion promoter based at least partially on input from the exhaust gas oxygen sensor when the engine is operating within the first engine load range, and controlling, e.g., trimming, the flow rate of the ammonia based at least partially on input from the exhaust gas oxygen sensor when the engine is operating within the second engine load range.

Reference throughout this specification to features, advantages, or similar language does not imply that all of the features and advantages that may be realized with the apparatus, system and method of the present disclosure should be or are in any single embodiment of the disclosed apparatus, system and method. Rather, language referring to the features and advantages is understood to mean that a specific feature, advantage, or characteristic described in connection with an embodiment is included in at least one embodiment of the disclosed apparatus, system and method. Thus, discussion of the features and advantages, and similar language, throughout this specification may, but do not necessarily, refer to the same embodiment.

Furthermore, the described features, advantages, and characteristics of the disclosed apparatus, system and method may be combined in any suitable manner in one or more embodiments. One skilled in the relevant art will recognize that the apparatus, system and method may be practiced without one or more of the specific features or advantages of a particular embodiment. In other instances, additional features and advantages may be recognized in certain embodiments that may not be present in all embodiments of the disclosed apparatus, system and method.

BRIEF DESCRIPTION OF THE DRAWINGS

In order that the advantages of the disclosed apparatus, system and method will be readily understood, a more particular description of the apparatus, system and method briefly described above will be rendered by reference to specific embodiments that are illustrated in the appended drawings. Understanding that these drawings depict only exemplary embodiments of the disclosed subject matter and are not therefore to be considered to limit the scope of the disclosed subject matter, the subject matter of the present application will be described and explained with additional specificity and detail through the use of the accompanying drawings, in which.

DETAILED DESCRIPTION

Figure 1:
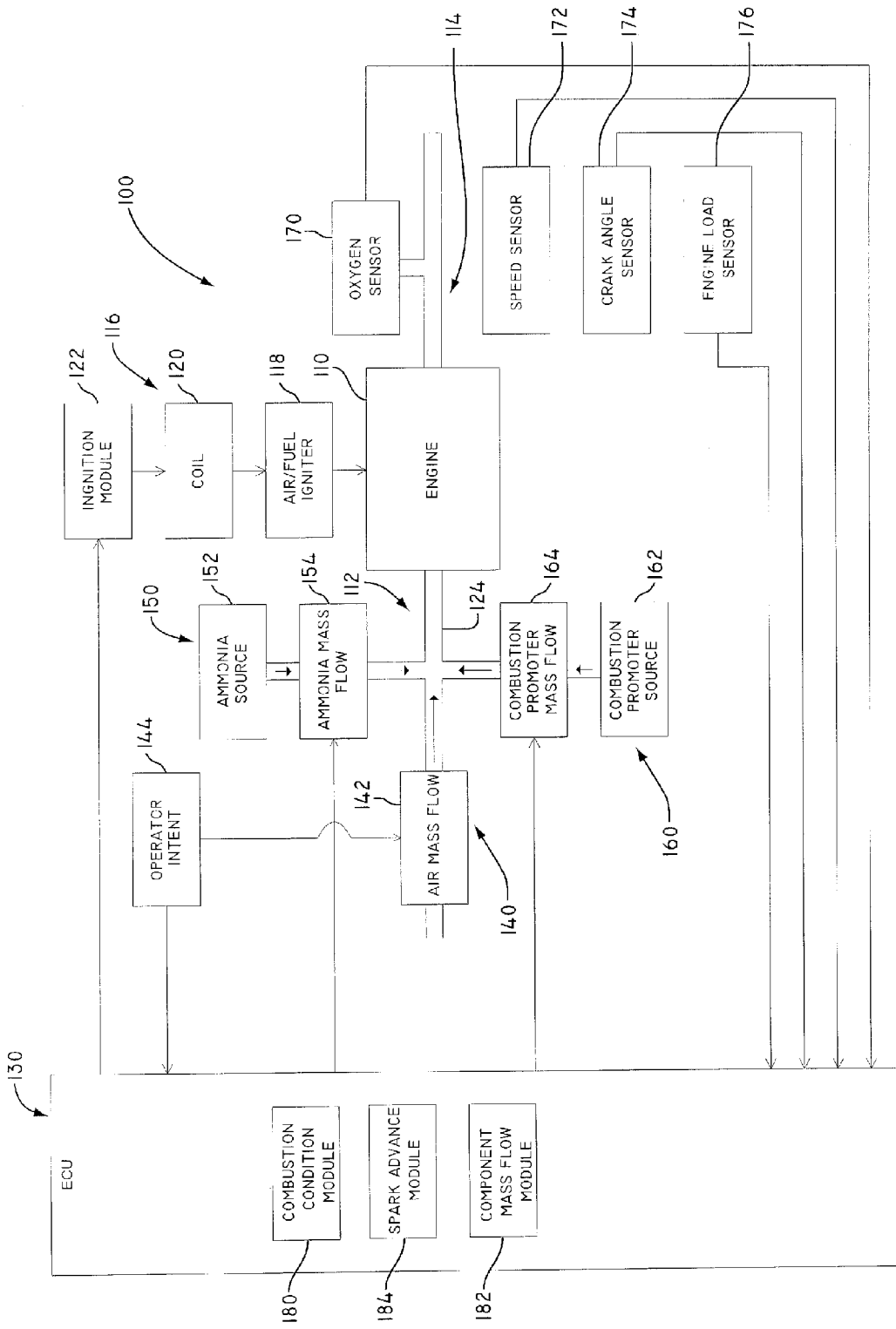
FIG. 1 is a schematic diagram of an engine system according to one representative embodiment.

Reference throughout this specification to "one embodiment," "an embodiment," or similar language means that a particular feature, structure, or characteristic described in connection with the embodiment is included in at least one embodiment of the apparatus, system or method disclosed in the application. Thus, appearances of the phrases "in one embodiment," "in an embodiment," and similar language throughout this specification may, but do not necessarily, all refer to the same embodiment.

Furthermore, the described features, structures, or characteristics of the apparatus, system and method disclosed herein may be combined in any suitable manner in one or more embodiments. In the following description, numerous specific details are provided to provide a thorough understanding of embodiments of the disclosed subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of disclosed subject matter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Further, a module may include a component or group of components operatively coupled to perform one or more specific functions.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Referring to FIG. 1, and according to one representative embodiment, dual fuel internal combustion engine system 100 includes a spark ignition engine 110 coupled to an intake system 112 and an exhaust system 114. The intake system 112 is coupled to respective inlets of one or more combustion chambers or cylinders (not shown) of the engine 110 and the exhaust system 114 is coupled to respective outlets of the one or more combustion chambers of the engine. The engine 110 further includes an ignition system 116. The ignition system 116 includes igniters 118 each positioned in spark igniting communication within a respective combustion chamber. The igniters 118 are coupled to respective coils 120 that are controlled by an ignition module 122 to provide the energy for producing the spark of the igniters 118. The ignition module 122 is in electrical communication with an electronic control unit or module 130, such as an engine control unit. In some implementations, each igniter 118 is a conventional spark plug. In other implementations, the igniters 118 can be any of various conventional spark inducing devices, such as a plasma spark igniter and laser spark igniter.

The intake system 112 includes an air intake system 140, an ammonia intake system 150, and a combustion promoter intake system 160 each coupled to a combustion chamber intake line 124. The intake line 124 feeds combustible materials into the combustion chamber.

The air intake system 140 includes an air mass flow rate metering device 142, such as a throttle body valve, operable to control the mass flow rate of air from an air source (not shown), such as the surrounding environment of the engine, into the air combustion chamber intake line 124. The air mass flow rate metering device 142 is directly or indirectly controlled at least partially according to the intent 144 of the operator. For example, in an automobile engine application, if the operator desires to increase speed, the operator can press down on the accelerator of the automobile, which will signal or cause the air mass flow rate metering device 142 to increase the mass flow rate of air into the intake line 124. The operator's intent 144 is also communicated with the electronic control unit 130, such as by an electronic signal from the accelerator pedal or throttle position sensor. Although not shown, the air intake system 142 may be coupled to a forced air induction system, such as a supercharger or turbocharger, to increase the pressure of the air entering the intake line 124.

The ammonia intake system 150 includes an ammonia source 152 coupled to an ammonia mass flow rate metering device 154. The ammonia mass flow rate metering device 154 is operable to control the mass flow rate of ammonia from the ammonia source 152 into the intake line 124. The ammonia mass flow rate metering device 154 is electrically coupled to the electronic control unit 130 and controls the mass flow rate of ammonia into the intake line 124 in response to communications received from the electronic control unit 130.

The combustion promoter intake system 160 includes a combustion promoter source 162 coupled to a combustion promoter mass flow rate metering device 164. The combustion promoter mass flow rate metering device 164 is operable to control the mass flow rate of combustion promoter from the combustion promoter source 162 into the intake line 124. Like the ammonia mass flow rate metering device 154, the combustion promoter metering device 164 is electrically coupled to the electronic control unit 130 and controls the mass flow rate of combustion promoter into the intake line 124 in response to communications received from the electronic control unit 130. The ammonia mass flow rate metering device 154 and combustion promoter mass flow rate metering device 164 can be any of various conventional variable rate metering or dispensing pumps and valves. The combustion promoter can be any of various fuels, such as, but not limited to, gasoline, hydrogen, hydrazine, natural gas and propane, alcohols or other hydrocarbons.

The ammonia source 152 is separate from the combustion promoter source 162. The ammonia and the combustion promoter are separately stored before being independently metered into the intake line 124 to form an ammonia and combustion promoter mixture. In some implementations, the combustion promoter is obtained independent of the ammonia.

The exhaust system 114 includes an oxygen sensor 170 in electronic communication with the electronic control unit 130. The oxygen sensor 170 senses the oxygen content of the exhaust gas exiting the engine 110 and transmits the sensed oxygen level to the electronic control unit 130. In certain implementations, the oxygen sensor 170 senses the amount of oxidizer and reducer in the exhaust gas, and the effective oxygen content is determined by measuring the net balance of oxidizer and reducer in the exhaust gas. The oxygen sensor 170 can be any of various conventional oxygen sensors known in the art.

The engine system 100 further includes several sensors configured to sense various operating conditions of the engine. For example, the engine system 100 includes an engine speed sensor 172, a crank angle sensor 174 and an engine load sensor 176 each coupled to the engine 110. In certain implementations, the engine load sensor 176 can include, but is not limited to, a throttle position sensors, mass air flow sensors, manifold pressure sensors, manifold temperature sensors, ambient air pressure sensors, cylinder pressure sensors and/or direct torque sensors. The engine speed sensor 172 senses the speed or rotations-per-minute (RPM) of the engine 110. The crank angle sensor 174 senses the crank angle of the crank shaft of the engine 110. The engine load sensor 176 senses the engine load of the engine 110. The engine load can be represented by the specific fuel input, which is the total fuel lower heating value energy input per cycle, divided by the swept cylinder volume of the combustion chamber. The engine load can also be represented by the net indicated mean effective pressure or the brake mean effective pressure for each cycle. Periodically, such as after each combustion cycle, each of the sensors 172, 174, 176 transmits the sensed data to the electronic control unit 130.

The electronic control unit 130 includes a combustion condition module 180. The combustion condition module 180 determines a desired or target combustion condition of the engine 110. The desired combustion condition can be any condition at or between a rough limit and a knock limit as will be described in more detail below. Also, the combustion condition module 180 may determine that the engine should run on 100% gasoline, such as when ammonia is not available. Generally, the rough limit and knock limit are based at least partially on the ratio of ammonia to combustion promoter combusted by the engine 110. In some implementations, the combustion condition module 180 manually determines the desired target combustion condition based on user input. For example, an operator of the engine 110 may desire the engine to run at a specific combustion condition. The combustion condition module 180 may be electrically coupled to an operator accessible control pad or switch (not shown) that the operator can use to input the desired combustion condition. In some implementations, the combustion condition module 180 automatically determines the desired target combustion condition based on any of a number of factors, such as, for example, the cost of ammonia, the cost of combustion promoter, availability of ammonia, availability of the combustion promoter, style of driving, load averaging, and the overall efficiency of the engine.

The electronic control unit 130 also includes a component mass flow module 182. The component mass flow module 182 is configured to determine the ammonia to combustion promoter ratio, or the amount of ammonia compared to the amount of combustion promoter to be combusted in the engine 110, based at least partially on the desired combustion condition, RPM of the engine, the engine load, and any of various other operating parameters. The component mass flow module 182 can include a memory in which a look-up table based on one or more operating maps, such as shown in FIGS. 2 and 4-6, is stored. The ammonia to combustion promoter ratio can be determined from the look-up table based on the current and/or desired operating parameters of the engine 110.

The electronic control unit 130 also includes a spark advance module 184 configured to determine the spark advance or timing of the spark generated by the igniters 118 relative to the sensed angle of the crank. Similar to the component mass flow module 182, the spark advance module 184 can determine the desired spark advance from a look-up table based on one or more operating maps, such as shown in FIGS. 2 and 4-6, stored in a memory of the module.

As will be described in more detail below, operation of a dual fuel spark ignition internal combustion engine according to one or more of the operating maps shown in FIGS. 2 and 4-6 promotes decreased emissions, increased efficiency, and lower consumption of fossil fuels without significant degradation in performance of the engine compared to conventional gasoline powered internal combustion engines.

Figure 2:
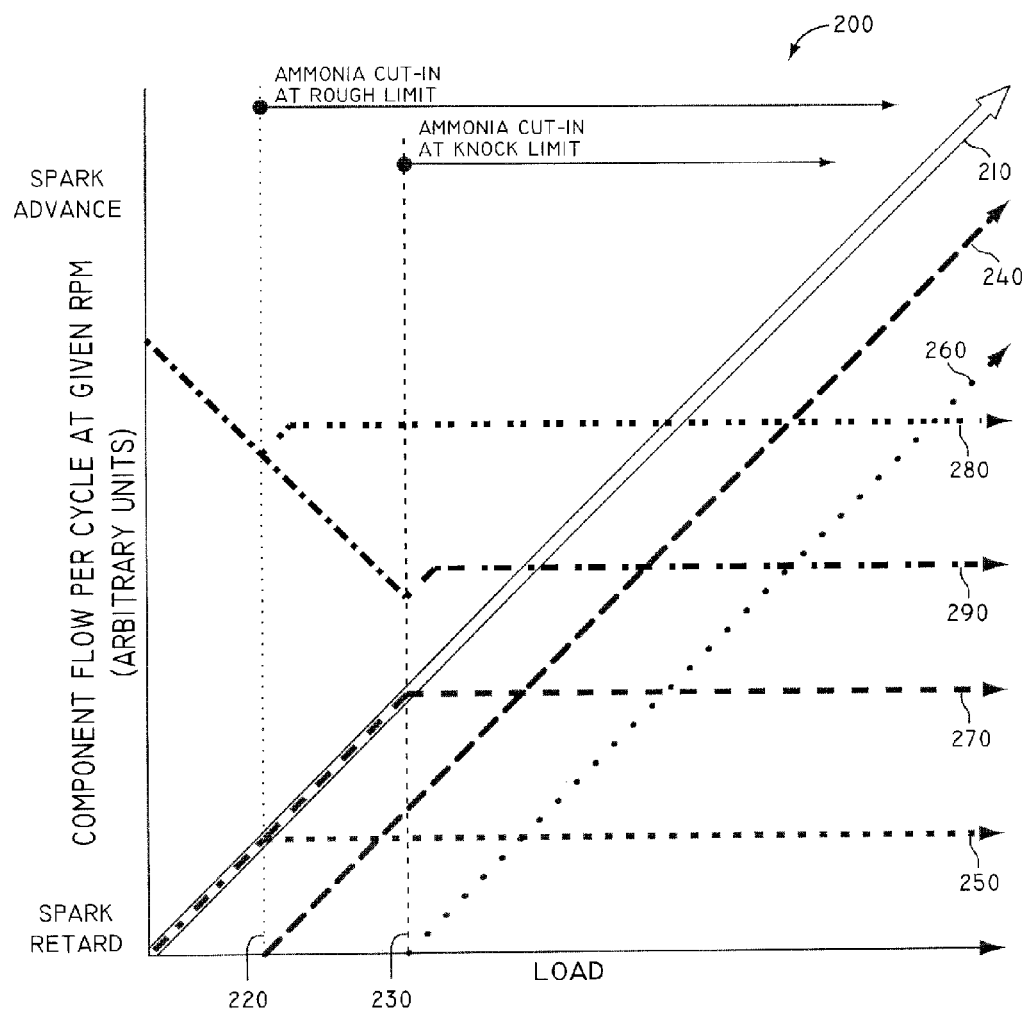
FIG. 2 is an operating map for operation of the engine system of FIG. 1 at a given compression ratio and engine speed according to one representative embodiment.

Referring to FIG. 2, according to one embodiment, an operating map 200 for achieving stoichiometric operation of the engine 110 across all operating loads of the engine is shown. As used herein, stoichiometric operation is defined as operation within a specific percentage of actual stoichiometric operation. For example, in some instances, the specific percentage is ±1% of actual stoichiometric operation. In other instances, the specific percentage is ±0.2% of actual stoichiometric operation. Generally, the engine system 100 is controllable to operate the engine 110 in a single fuel mode and dual fuel mode. In the single fuel mode, the engine operates, runs or is fueled solely on the combustion promoter. In the dual fuel mode, the engine operates, runs or is fueled on a mixture of ammonia and combustion promoter.

As shown on the operating map 200, the engine 110 operates in the single fuel mode when the engine load is between zero and the ammonia cut-in point load, i.e., the load at which the ammonia cut-in point occurs. The ammonia cut-in point occurs at the lowest engine load in which ammonia can be added to the fuel to achieve the desired combustion condition.

In the single fuel mode, the electronic control unit 130, with feedback from the oxygen sensor 170, sets the mass flow rate of the ammonia mass flow rate metering device 154 to zero and increases the mass flow rate of the combustion promoter by varying the combustion promoter mass flow rate metering device 164 as the load increases from zero to the ammonia cut-in load. Similarly, the air mass flow rate metering device 140 increases the mass flow rate 210 of air into the intake line 124 as the load increases from zero to the ammonia cut-in load. In the single fuel mode, the combustion promoter and air increase in a substantially constant ratio as load increases.

It is noted that the operating map 200 is used to show the mass flow rate trends of the various components relative to each other at a given engine speed (RPM) and therefore, the component flow per cycle units for each component is arbitrary and not necessarily absolute. For example, a portion of the mass flow rate for the combustion promoter and air are shown overlapping each other for illustrating the relative mass flow rate trends of combustion promoter and air and not the actual mass flow rate amounts. In other words, the mass flow rate of air is typically many times higher than the mass flow rate of gasoline, such as 14.5 times higher, but is shown equal to the mass flow rate of gasoline in the single fuel mode for illustrative purposes only.

Once the load has increased to the ammonia cut-in point, the engine system 100 switches to the dual fuel mode by controlling the combustion promoter mass flow rate metering device 164 to hold the combustion promoter mass flow rate constant and controlling the ammonia mass flow rate metering device 154 to introduce ammonia into the intake line 124. In the dual fuel mode, the mass flow rate of the combustion promoter remains steady and the ammonia mass flow rate metering device 154 increases the mass flow rate of ammonia as the engine load increases. Accordingly, in the dual fuel mode, the ratio of ammonia to combustion promoter in the fuel mixture combusted by the engine increases as the engine load increases. Generally, once the ammonia cut-in point is reached, the increased energy necessary for each cycle is provided by the increased amount of ammonia. Moreover, the electronic control unit 130, with feedback from the oxygen sensor 170, controls the ratio of ammonia to combustion promoter in the fuel mixture such that stoichiometric combustion of the ammonia and combustion promoter is maintained for each engine cycle at any load at or above the ammonia cut-in point.

In one implementation, the combustion condition module 180 may determine that the desired combustion condition is the rough limit. Accordingly, in the dual fuel mode, electronic control unit 130 controls the ammonia to combustion promoter ratio of the mixture such that the engine roughness, i.e., the coefficient of variation of the net indicated mean effective pressure, is below a predetermined percentage. Generally, the rough limit corresponds to operation of the engine at a nominal efficiency, e.g., roughness of less than about 5%, on the lowest amount of combustion promoter or the highest amount of ammonia relative to combustion promoter. In some implementations, the roughness is less than about 3%, and in yet other implementations, the roughness is between about 3% and about 5%. In other words, operation at the roughness limit seeks to promote the extent to which gasoline is replaced with ammonia. Because less combustion promoter is used, operation at the rough limit results in lower gasoline usage and lower emissions (particularly when the combustion promoter is gasoline) than operation at the knock limit. Therefore, in some instances, the desired target combustion condition may be the rough limit when one or more of the following factors is true: cost of ammonia is relatively low, the cost of combustion promoter is relatively high, availability of ammonia is relatively high, and the availability of the combustion promoter is relatively low.

In another implementation, the combustion condition module 180 may determine that the desired combustion condition is the knock limit. Accordingly, in the dual fuel mode, electronic control unit 130 controls the ammonia to combustion promoter ratio of the mixture such that engine operates substantially knock-free. Generally, the knock limit corresponds to operation of the engine on the highest amount of combustion promoter or the lowest amount of ammonia relative to combustion promoter without knock while maintaining the maximum brake torque (MBT) spark advance as will be described in more detail below. In some instances, the desired target combustion condition may be the knock limit when one or more of the following factors is true: cost of ammonia is relatively high, the cost of combustion promoter is relatively low, availability of ammonia is relatively low, and the availability of the combustion promoter is relatively high.

As shown in FIG. 2, if the desired combustion condition is the rough limit, the ammonia cut-in point is a rough limit ammonia cut-in point. In some implementations, the engine load range between zero load and the rough limit ammonia cut-in point corresponds to the engine at idle. If the desired combustion condition is the knock limit, the ammonia cut-in point is a knock limit ammonia cut-in point. The rough limit ammonia cut-in point occurs at a rough limit ammonia cut-in point load 220 and the knock limit ammonia cut-in point occurs at a knock limit ammonia cut-in load 230. As shown, the rough limit ammonia cut-in load 220 is a lower engine load than the knock limit ammonia cut-in load 230. In other words, ammonia is added to the combustion promoter sooner, e.g., at lower loads, when operating at the rough limit than when operating at the knock limit.

When operating at the rough limit, ammonia is introduced into the intake line 124 at the rough limit ammonia cut-in load 220. As the load increases from the rough limit ammonia cut-in load 220 to the maximum load of the engine, the rough limit flow rate 240 of ammonia is steadily increased, and the rough limit flow rate 250 of the combustion promoter is held substantially constant. Accordingly, the ratio of ammonia to combustion promoter steadily increases with increased load across the entire operating load of the engine above the rough limit ammonia cut-in load 220. As used herein, holding the mass flow rate of the combustion promoter substantially constant can include nominal increases or decreases in the mass flow rate of the combustion promoter, such as within a small percentage, e.g., ±3%, of the total charge energy of the combustion promoter. In some cases, nominal increases or decreases in the mass flow rate of the combustion promoter may be required to ensure that optimum efficiency, fuel consumption or other operating parameter is achieved.

When operating at the knock limit, ammonia is introduced into the intake line 124 at the knock limit ammonia cut-in load 230. As the load increases from the knock limit ammonia cut-in load 230 to the maximum load of the engine, the knock limit flow rate 260 of ammonia is steadily increased, and the knock limit flow rate 270 of the combustion promoter is held constant. Accordingly, the ratio of ammonia to combustion promoter steadily increases with increased load across the entire operating load of the engine above the knock limit ammonia cut-in load 230.

In yet another implementation, the combustion condition module 180 may determine that the desired combustion condition is a condition between the rough and knock limits. For example, if the cost of ammonia is relatively low, but the availability of ammonia is also relatively low, it may be desirable to run the engine below the knock limit and above the rough limit. In this instance, the ammonia cut-in limit load is between the rough and knock limit ammonia cut-in loads, and the ratio of ammonia to combustion promoter steadily increases with increased load in a manner similar to operation under the rough and knock limits.

The concept of spark advance and its relationship with engine knock is well known in the art. In conventional single fuel spark ignition engines, as the engine load increases, the spark advance is retarded or delayed to avoid engine knock and/or to maintain the MBT condition. Referring again to FIG. 2, in the dual fuel engine system 100, the spark advance is retarded in the single fuel mode, e.g., before the ammonia cut-in, but the spark advance is held substantially constant in the dual fuel mode, e.g., after the ammonia cut-in. As used herein, holding the spark advance substantially constant can include small increases in the spark advance, such as the small increase in the spark advance just after the ammonia cut-in.

More specifically, when operating at the rough limit, the rough limit spark advance 280 is steadily decreased or delayed as load increases from zero to the rough limit ammonia cut-in load 220. In the illustrated implementations, just after the rough limit ammonia cut-in load 220, the spark advance 280 is increased for a small range of engine loads to maintain MBT. However, after the small jump, the spark advance 280 is held substantially constant up to the maximum engine load of the engine 110.

Similarly, when operating at the knock limit, the knock limit spark advance 290 is steadily decreased or delayed as load increases from zero to the knock limit ammonia cut-in load 230. In the illustrated implementations, like the rough limit spark advance 280, just after the knock limit ammonia cut-in load 230, the spark advance 290 is increased for a small range of engine loads. The spark advance 290 is then held substantially constant up to the maximum engine load of the engine 110.

The spark advance is held substantially constant in the dual fuel mode because of the replacement of combustion promoter with ammonia. Like conventional single fuel gasoline engines, as load increases with the dual fuel engine 110, the fuel mixture density in the cylinder, which typically requires an increase in spark advance delay, is increased. However, because ammonia is effectively replacing the combustion promoter, and the flammability of ammonia is typically less than the combustion promoter, the combustion promoter fraction decreases and the flammability of the contents within the cylinder also decreases. In other words, as the mixture density of the cylinder increases in the dual fuel mode, the ratio of ammonia to combustion promoter increases. The increase in the ammonia to combustion promoter ratio offsets the effects of increased mixture density and maintains the flammability of the mixture at a relatively constant level. Further, ammonia has a higher octane rating than gasoline. Therefore, the spark advance can be held substantially constant in the dual fuel mode.

Figure 3:
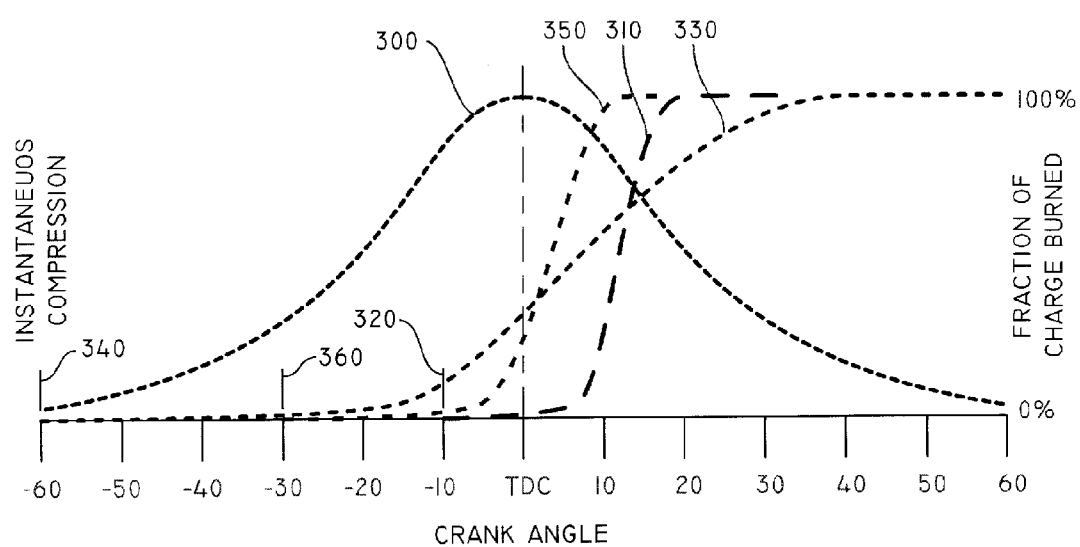
FIG. 3 is a graph of the mass fraction burn curve for various engine operating conditions as a function of the crank angle and instantaneous cylinder compression.

The ability to hold the spark advance substantially constant at MBT spark advance in dual fuel operation over a range of high engine loads promotes improved thermal efficiency of the engine. Referring to FIG. 3, mass fraction burn curves at MBT spark advance for various operating conditions versus the crank angle of the engine and the instantaneous compression curve 300 are shown. FIG. 3 also shows the mass fraction burn curve 310 for a conventional gasoline only fueled engine. The mass fraction burn curve 310, which represents the knock limited spark advance for conventional single fuel gasoline powered engines, typically begins at the spark ignition point 320. The mass fraction burn curve 330 for the engine 110 operating at the rough limit in the dual fuel mode at high loads typically begins at the spark ignition point 340. Curve 330 also corresponds to MBT spark advance at the rough limit for gasoline only at a low load, such as idle. The mass fraction burn curve 350 for the engine 110 operating at the knock limit in the dual fuel mode at high loads typically beings at the spark ignition point 360. Curve 350 also corresponds to MBT spark advance at the knock limit for gasoline only near the knock limit ammonia cut-in load 230. The spark ignition points 320, 340, 360 are timed to begin when the crank angle reaches about −10 degrees, −60 degrees, and −30 degrees, respectively.

Generally, the thermal efficiency of an engine is dependent on the amount of combustion that occurs at or near top dead center (TDC). As the bulk of combustion occurs further away from TDC after TDC is reached, the thermal efficiency of the engine is likely to decrease. In contrast, as the bulk of combustion occurs closer to TDC after TDC is reached, the thermal efficiency of the engine is likely to increase. In conventional single fuel gasoline powered engines, the spark advance ignition point 320 must be significantly retarded away from MBT to avoid engine knock. Accordingly, the bulk of combustion with conventional engines (see mass fraction burn curve 310), or the engine 110 operating solely on the combustion promoter at loads exceeding the knock limit ammonia cut-in load 230, occurs further away from TDC with increasing load such that the thermal efficiency of the engine suffers.

Because additional ammonia has a neutral effect on the flammability of the ammonia and combustion promoter mixture at high loads, ammonia is replacing the combustion promoter in greater ratios, and the combustion promoter input per cycle is being held constant, the flammability of the mixture is not increasing at the rate experienced with combustion promoter alone. Therefore, the MBT spark advance ignition point 340 and 360 need not be delayed as much as the spark advance ignition point 320. Accordingly, the bulk of combustion with the engine 110 operating at either the rough limit or the knock limit in the dual fuel mode at high loads occurs closer to TDC, which results in a higher thermal efficiency, and thus lower exhaust gas temperatures, than conventional single fuel gasoline powered engines at the same loads. Additionally, the higher engine efficiency achieved by running the engine 110 on ammonia and combustion promoter as discussed above makes an engine running at least partially on ammonia more economically favored over an engine running solely on gasoline even when the cost of ammonia is the same as that of gasoline on a lower heating value energy basis.

The engine 110 fueled by ammonia and a combustion promoter in the dual fuel mode according to the operational map of FIG. 2 is capable of operating at higher loads than conventional engines, e.g., the engine 110 fueled solely by the combustion promoter. As discussed above, with spark ignited internal combustion engines, the fuel density in the cylinder, and thus the flammability of the fuel, increases with increased load until the flammability reaches a level that induces knock in the engine. The engine load at which knock occurs due to increased flammability of the fuel is defined herein as the knock-limited maximum engine load of the engine. Because ammonia is substituted for combustion promoter in the dual fuel system 100 at higher loads, the flammability of the ammonia and combustion promoter mixture in the engine 110 is less than the flammability of 100% combustion promoter at the same load. Therefore, the dual fuel system 100 is able to run the engine 110 on ammonia and combustion promoter at higher loads without the threat of knock compared to running the engine 110 solely on combustion promoter. In other words, because ammonia is substituted for combustion promoter in the dual fuel system 100 at higher loads, the knock-limited maximum engine load is higher than conventional single fuel engines.

The ability to run the engine 110 at higher knock-limited engine loads compared to conventional engines results in more power and higher operating efficiency. Additionally, because the knock-limited engine load is higher, engines run on ammonia and combustion promoter according to the operating map of FIG. 2 can be smaller and more lightweight than conventional engines, while producing the same power output as conventional engines.

Figure 4:
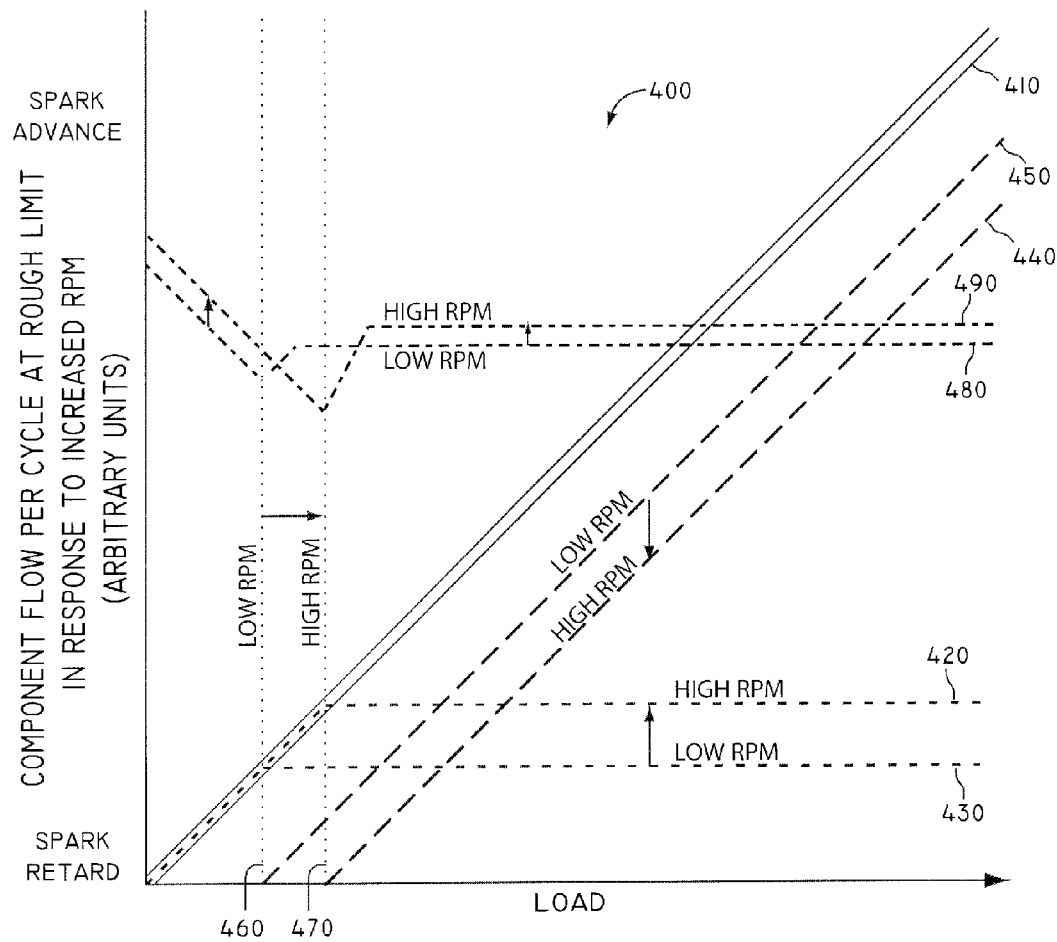
FIG. 4 is an operating map for operation of the engine system of FIG. 1 at the rough limit and a given compression ratio for varying engine speeds.
Figure 5:
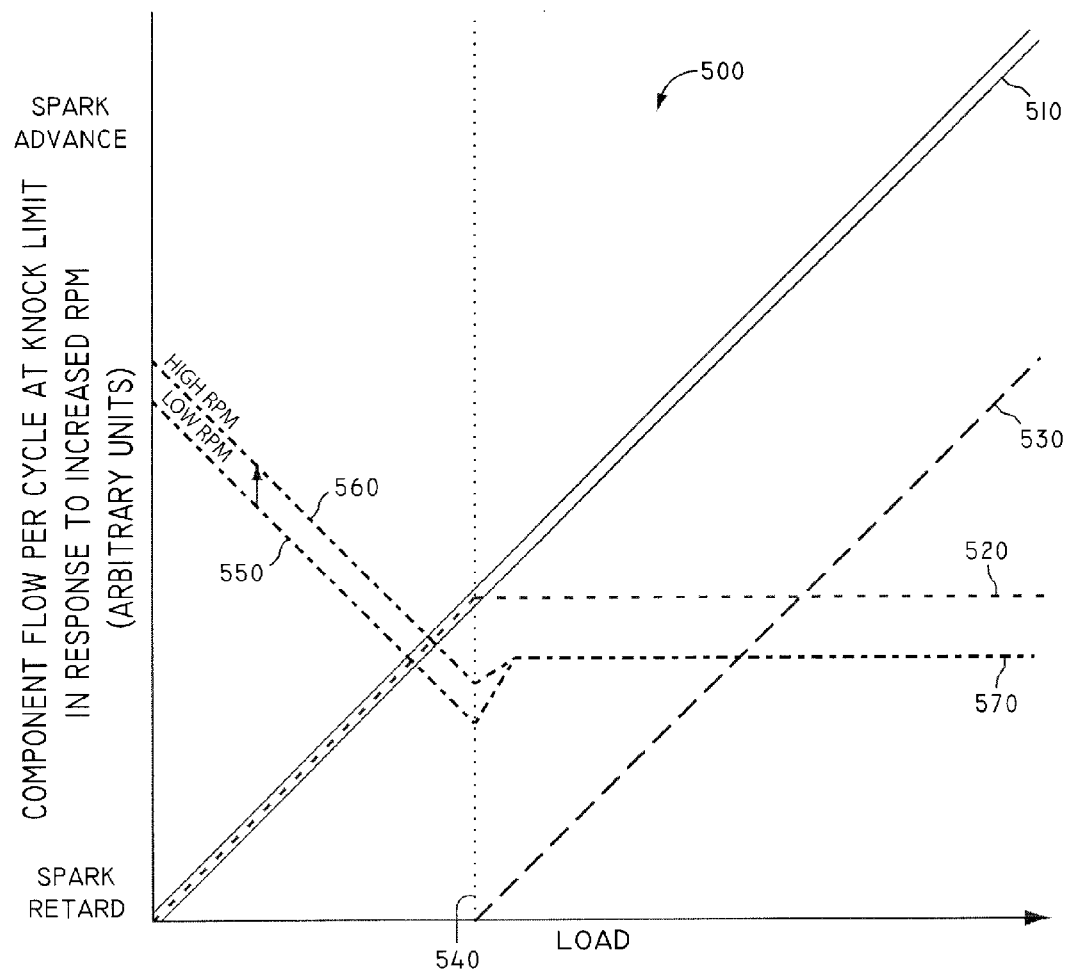
FIG. 5 is an operating map for operation of the engine system of FIG. 1 at the knock limit and a given compression ratio for varying engine speeds.

In some implementations, the speed or RPM at which the engine 110 is operated affects the operating map of the system 100. FIG. 2 depicted an operating map 200 of the engine system 100 at a given engine speed or RPM. FIGS. 4 and 5 depict respective operating maps 400, 500 of the engine system 100 similar to map 200, but showing the effects on the map of varying the RPM of the engine for operation at the rough limit and knock limit, respectively.

As shown in FIG. 4, when operating at the rough limit, a change in the RPM of the engine 110 corresponds to a shift in the ammonia cut-in load and the spark advance. The air mass flow rate for both high and low RPM is indicated at 410, the combustion promoter mass flow rate at high RPM is indicated at 420, the combustion promoter mass flow rate at low RPM is indicated at 430, the ammonia mass flow rate at high RPM is indicated at 440, and the ammonia mass flow rate at low RPM is indicated at 450. The low RPM ammonia cut-in load 460, i.e., the ammonia cut-in load when operating the engine 110 at a low RPM, is lower than the high RPM ammonia cut-in load 470, i.e., the ammonia cut-in load when operating the engine at a high RPM. Accordingly, the addition of ammonia as a substitute for combustion promoter and holding the combustion promoter level constant occurs at lower loads at low RPM and higher loads at high RPM. In other words, the ratio of ammonia to combustion promoter combusted in the engine at a given engine load is lower at higher RPM, and higher at lower RPM.

The shift in ammonia cut-in loads between low and high RPM also corresponds to a shift in the spark advance. The spark advance at low RPM is indicated at 480 and the spark advance at high RPM is indicated at 490. As shown, both the low RPM spark advance 480 and the high RPM spark advance 490 are steadily delayed as the engine load increases from zero to the low RPM ammonia cut-in load 460 and high RPM ammonia cut-in load 470, respectively. As the engine load increases, both the low RPM spark advance 480 and high RPM spark advance 490 undergo a sharp increase just after the low RPM ammonia cut-in load 460 and high RPM ammonia cut-in load 470, respectively, are reached. After the sharp increase in spark advance, both the low and high RPM spark advance 480, 490 are held constant as the load increases. More specifically, the low RPM spark advance 480 is held at a more delayed spark advance than the high RPM spark advance 490. Accordingly, the increase in spark advance just after the ammonia cut-in load is greater with the high RPM spark advance 490 than with the low RPM spark advance 480.

Generally, as shown in FIG. 4, the higher the RPM, the higher the rough limit. As the RPM increases, a higher load is required before ammonia can be substituted for combustion promoter. Otherwise the engine would run inefficiently below the rough limit. In some instances, the engine 110 can be smaller and/or fewer cylinders used such that the average load is higher than with conventional gasoline powered engines. In this manner, if operation at the rough limit is desired, such as to conserve combustion promoter, the engine can be run at the rough limit over a greater percentage of the operation range of the engine.

Like the operating map 400 of FIG. 4, a change in the RPM of the engine 110 corresponds to a shift in the spark advance when operating at the knock limit as shown in the operating map 500 of FIG. 5. However, unlike the operating map 400, a change in the RPM of the engine 100 does not have a substantial effect on the ammonia cut-in load when operating at the knock limit. The air mass flow rate for both high and low RPM is indicated at 510, the combustion promoter mass flow rate at high and low RPM is indicated at 520, the ammonia mass flow rate at high and low RPM is indicated at 530, and the ammonia cut-in load for both high and low RPM is indicated at 540. As shown in FIG. 5, when the engine 110 is operating at the knock limit, the ammonia cut-in load 540 remains substantially the same at high and low RPM. Accordingly, the ratio of ammonia to combustion promoter combusted in the engine at a given load is substantially the same at high and low RPM. The ammonia cut-in load at the knock limit is not strongly affected by RPM because knock generally occurs soon after TDC, e.g., where the charge is nearly fully compressed, which is a region that is not strongly dependant on RPM.

Although the ammonia cut-in load 540 remains substantially the same for high and low RPM, the spark advance before the ammonia cut-in load is reached shifts according to a change in RPM. As the load increases from zero to the ammonia cut-in load 540, the low RPM spark advance 550 and high RPM spark advance 560 decrease at the same steady rate with the low RPM spark advance 550 being lower than the high RPM spark advance 560 at a given load. Just after the ammonia cut-in load 540 is reached, both the low RPM spark advance 550 and high RPM spark advance 560 sharply increase with increased load, and are then held steady at the same spark advance 570 as the engine load increases up to the maximum engine load, e.g., maximum operating pressure, of the engine.

In some vehicular implementations, such as when the swept cylinder volume is about 0.6 liters, the low RPM is between about 500 RPM and about 1,000 RPM and the high RPM is between about 4,000 RPM and about 6,000 RPM. However, in other implementations, such as when the swept cylinder volume is greater than or less than 0.6 liters, the low and high RPM ranges may be nominally or substantially different.

Figure 6:
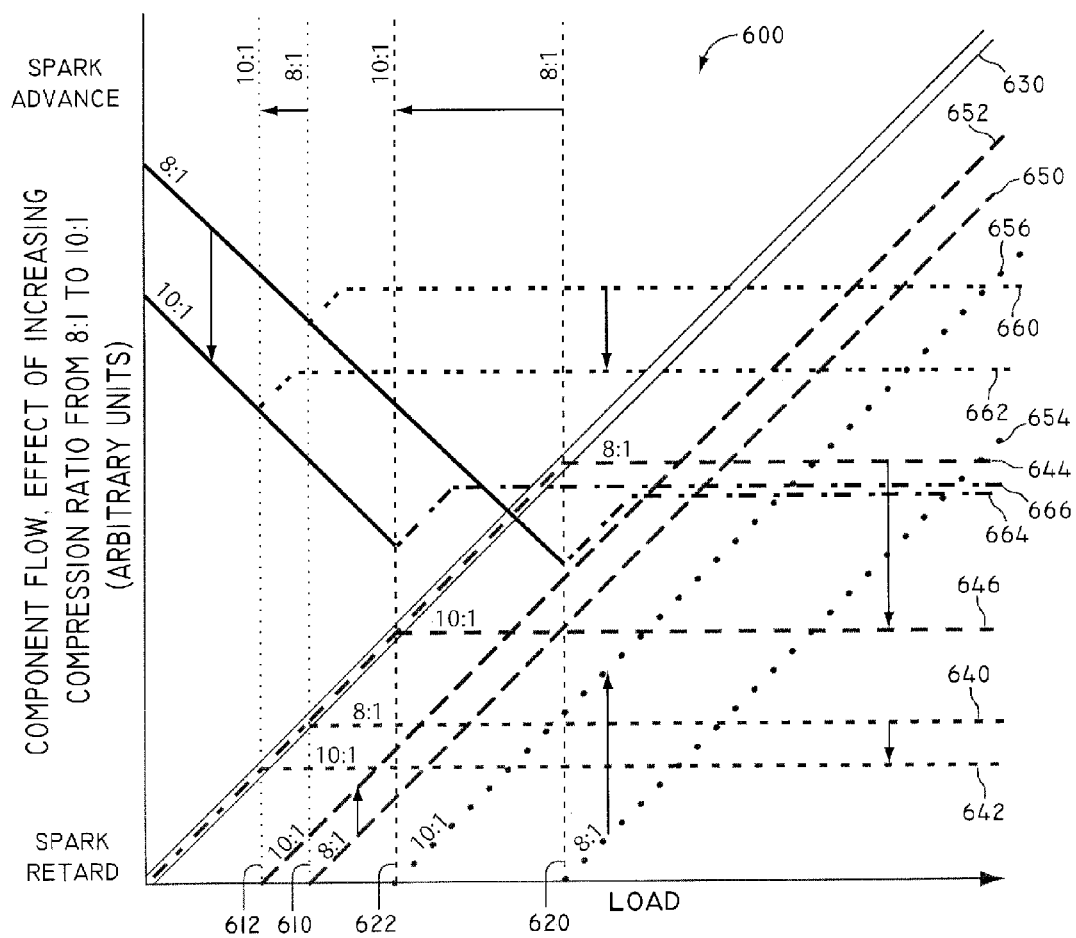
FIG. 6 is an operating map for operation of the engine system of FIG. 1 at varying compression ratios.

In some implementations, the compression ratio of the engine 110 affects the operating map of the system 100. FIG. 2 depicted an operating map 200 of the engine system 100 with the engine 110 at a given compression ratio. FIG. 6 depicts respective an operating map 600 of the engine system 100 similar to map 200, but showing the effects on the map of varying the compression ratio of the engine 110.

Generally, increasing the compression ratio of the engine from 8:1 to 10:1 results in a lowering of the ammonia cut-in load and an overall thermal efficiency gain in the engine. For example, the 8:1 compression ratio rough limit ammonia cut-in load 610 is higher than the 10:1 compression ratio rough limit ammonia cut-in load 612. Similarly, the 8:1 compression ratio knock limit ammonia cut-in load 620 is higher than the 10:1 compression ratio knock limit ammonia cut-in load 622. Accordingly, in some implementations, the substitution of ammonia for combustion promoter occurs earlier on in the operation load range of the engine with engines having a higher compression ratio. Therefore, at a given operating load in the dual fuel mode, the ratio of ammonia to combustion promoter is higher for a 10:1 compression ratio engine compared to an 8:1 compression ratio engine. Further, the difference between the rough limit ammonia cut-in loads 610, 612 for 8:1 and 10:1 compression ratios, respectively, is much less than the difference between the knock limit ammonia cut-in loads 620, 622 for 8:1 and 10:1 compression ratios, respectively. In other words, the ratio of ammonia to combustion promoter is less dependent on compression ratio at the rough limit, than at the knock limit. Therefore, a change in compression ratio generally has a greater impact on the ratio of ammonia to combustion promoter when the engine is operating at the knock limit than when the engine is operating at the rough limit.

Generally, the various mass flow rate trends for air, combustion promoter and ammonia in FIG. 6 are the same as the mass flow rate trends for air, combustion promoter and ammonia in FIG. 2. As will be recognized, the main difference between the various mass flow rates of FIG. 6 and FIG. 2 is the point at which ammonia is introduced and the point at which the combustion promoter is held constant. For convenience, the air mass flow rate for both 8:1 and 10:1 compression ratios is indicated at 630, the rough limit combustion promoter mass flow rate at 8:1 compression ratio is indicated at 640, the rough limit combustion promoter mass flow rate at 10:1 compression ratio is indicated at 642, the knock limit combustion promoter mass flow rate at 8:1 compression ratio is indicated at 644, the knock limit combustion promoter mass flow rate at 10:1 compression ratio is indicated at 646, the rough limit ammonia mass flow rate at 8:1 compression ratio is indicated at 650, the rough limit ammonia mass flow rate at 10:1 compression ratio is indicated at 652, the knock limit ammonia mass flow rate at 8:1 compression ratio is indicated at 654, and the knock limit ammonia mass flow rate at 10:1 compression ratio is indicated at 656.

FIG. 6 also shows the effects of compression ratio on the spark advance. The respective spark advances for operation at the rough and knock limit for 8:1 and 10:1 follow the same general trends as the associated spark advances shown in FIG. 2 and discussed above. However, the spark advances are shifted as the compression ratio moves between 8:1 and 10:1. For example, the 8:1 compression ratio rough limit spark advance 660 is less delayed than the 10:1 compression ratio rough limit spark advance 662 across the entire operating load range of the engine 110. Although the 8:1 compression ratio knock limit spark advance 664 and the 10:1 compression ratio knock limit spark advance 666 are shifted relative to each other, the 8:1 compression ratio knock limit spark advance is held constant at a more delayed spark advance than the spark advance at which the 10:1 compression ratio knock limit spark advance is held steady.

In operation, the engine 110 is started and the operator's intent 144 is determined and transmitted to the electronic control unit 130 and the air flow metering device 142. Based on the operator's intent 144, the air mass flow metering device 142 increases or decreases the amount of air flowing into the intake line 124. The electronic control unit 130 processes the operator's intent 144, along with data received from one of several sensors sensing conditions of the system 100, such as the oxygen sensor 170, speed sensor 172, crank angle sensor 174, and engine load sensor 176. Based on the operator's intent 144, data from the various sensors, and/or operator's input, the combustion condition module 180 determines the desired combustion condition of the engine 110.

Using the desired combustion condition determined by the combustion condition module 180, the operator's intent 144, and data from the several sensors, the component mass flow module 182 and the spark advance module 184 consult the operating maps of FIGS. 2 and 4-6 to determine the appropriate ammonia to combustion promoter ratio for substantial stoichiometric operation at the desired combustion condition. The electronic control unit 130 then controls the ammonia mass flow rate device 154 and/or the combustion promoter mass flow rate device 164 to introduce a fuel mixture having the appropriate ammonia to combustion promoter ratio into the intake line 124. The fuel mixture and air from the air mass flow metering device 142 is then introduced into the combustion chamber of the engine for combusting in an engine cycle. The operator's intent 144 is again determined and the process is repeated using data sensed from the previous cycle's output. In this manner, operation of the engine system 100 is performed according to a closed or dynamic loop control, and, in some instances, without operator intervention.

It is recognized that in some situations ammonia may not be readily available. In these situations, the combustion condition module 180 may determine that the engine should run on 100% gasoline. The component mass flow module 182 and spark advance module 184 would not consult the operating maps of FIGS. 2 and 4-6, but would provide the parameters associated with conventional operation on 100% gasoline.

The combustion of ammonia with a combustion promoter according to the operating map described herein promotes clean emissions. Proper combustion of ammonia results in a byproduct consisting substantially of water vapor and nitrogen. In other words, proper combustion of ammonia does not result in the harmful exhaust emissions. As defined herein, harmful exhaust emissions includes any of various environmentally harmful substances, such as, but not limited to, greenhouse gas, CO, $CO_2$, or carbon particulates, produced by combustion of an internal combustion engine. Therefore, harmful emissions are reduced as the combustion promoter is replaced with ammonia. In other words, in some implementations, greenhouse gas, CO and $CO_2$ emissions can be reduced by the percentage of ammonia being used at any given time. Such a reduction in emissions facilitates adherence to the current pollution/emission standards and the pollution/emission standards for years to come.

Because combustion of ammonia and combustion promoter results in a less delayed spark advance compared to combustion of solely combustion promoter, the complete combustion of ammonia and combustion promoter occurs earlier in the cycle. Therefore, the exhaust gas temperature is reduced and large swings in the exhaust gas temperature are avoided. Lower exhaust gas temperatures and fewer gas temperature swings can substantially lengthen the service life of and reduce maintenance for the components of the exhaust system, such as, but not limited to, the exhaust valve and seat, exhaust manifold, headers, gaskets, sensors, exhaust pipes, mufflers, flanges, hangers and brackets, tail pipes, catalytic converter, and forced air induction device. Further, with lower exhaust temperatures, the requirements for the exhaust system can be relaxed, which can results in reduced manufacturing costs and vehicle weight.

Another possible advantage of using ammonia to fuel an internal combustion engine according to at least one embodiment described herein is an increase in road load efficiency compared to a similar engine run solely on gasoline. Because of a reduction in the throttling losses, the ability to operate at higher engine loads, and an increase in the mechanical efficiency of the engine, the road load efficiency is correspondingly increased. Further, the compression ratio of the engine can have a significant impact on the road load efficiency and thus the operating cost of the engine. For example, when operating at high load on dual fuel according to the operating maps described above, the operating cost for the engine 110 with a compression ratio of 10:1 can be about 1.5 times lower than the operating cost for the engine 110 with a compression ratio of 9:1 operating at a substantially throttled load.

A representative physical embodiment of an engine system operated on ammonia and gasoline according to at least some of the above principles was tested. The results of the test are described in "Operating Features of a Stoichiometric, Ammonia and Gasoline Dual Fueled Spark Ignition Engine" written by Shawn M. Grannell, Dennis N. Assanis, Stanislav V. Bohac and Donald E. Gillespie, published on Nov. 5, 2006, as IMECE2006-13048 for the 2006 ASME International Mechanical Engineering Congress and Exposition, and incorporated herein by reference.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A dual fueled spark ignition internal combustion engine, comprising:
    an engine intake line coupled to at least one combustion chamber;
    an air intake system in air supplying communication with the engine intake line;
    a fuel delivery system comprising a first ammonia source and a second combustion promoter source separate from the first ammonia source, the first ammonia source communicable in ammonia supplying communication with the engine intake line and the second combustion promoter source communicable in combustion promoter supplying communication with the engine intake line; and
    an electronic control module operable in a dual fuel mode to control the flow rate of ammonia and combustion promoter into the engine intake line to achieve substantially stoichiometric combustion of air, ammonia and combustion promoter in the combustion chamber for each cycle of the internal combustion engine;
    wherein when in the dual fuel mode, the ratio of ammonia to combustion promoter combusted in the combustion chamber increases as the engine load increases.

2. The internal combustion engine of claim 1, wherein the electronic control module is operable to control the flow of rate ammonia and combustion promoter into the engine intake to operate the engine at a desired operational state between a rough limit and a knock limit, wherein the ratio of ammonia to combustion promoter at the rough limit is higher than the ratio of ammonia to combustion promoter at the knock limit at a given engine load.

3. The internal combustion engine of claim 2, wherein the desired operational state of the engine is at least partially determined by at least one factor selected from the group consisting of operator desire, cost of ammonia, cost of combustion promoter, availability of ammonia, availability of combustion promoter, and overall engine efficiency.

4. The internal combustion engine of claim 1, wherein as the load increases the amount of combustion promoter combusted in the combustion chamber remains substantially constant, and amount of ammonia combusted in the combustion chamber increases per engine cycle.

5. The internal combustion engine of claim 4, further comprising an exhaust gas oxygen sensor electrically coupled to the electronic control module, wherein the amount of ammonia combusted in the combustion chamber is at least partially determined by the net balance between the oxidizer and reducer in the exhaust gas as sensed by the exhaust gas oxygen sensor.

6. The internal combustion engine of claim 1, wherein the electronic control module is operable to control a combustion spark advance of the internal combustion engine, and wherein when the ratio of ammonia to combustion promoter is greater than zero, the spark advance is held substantially constant as the operation load of the engine increases.

7. The internal combustion engine of claim 1, wherein the electronic control module is further operable in a single fuel mode to reduce the flow rate of ammonia to zero to achieve substantially stoichiometric combustion of only air and combustion promoter in the combustion chamber per cycle at each operating load of the internal combustion engine, wherein the maximum operating load of the engine in the dual fuel mode is higher than the maximum operating load of the engine in the single fuel mode.

8. The internal combustion engine of claim 1, wherein the combustion promoter is selected from the group consisting of gasoline and other hydrocarbons, alcohols, and hydrogen.

9. The internal combustion engine of claim 1, wherein an amount of harmful exhaust emissions produced by the engine in the dual fuel mode are lower than the harmful exhaust emissions produced by the engine if fueled solely with the combustion promoter.

10. The internal combustion engine of claim 1, wherein in the dual fuel mode the engine is operable at a dual fuel engine operating efficiency per cycle at a given load, and wherein the dual fuel engine operating efficiency is higher than a single fuel engine operating efficiency achieved by operating the engine solely on the combustion promoter.

11. An internal combustion engine system, comprising:
a spark ignition internal combustion engine operable at any of various combustion conditions between a rough limit and a knock limit in a single fuel mode and a dual fuel mode, wherein in the single fuel mode the fuel is a combustion promoter and in the dual fuel mode the fuel is a mixture of ammonia and said combustion promoter;
a fuel metering module operable to control the flow rate of ammonia and the flow rate of combustion promoter into the engine such that the mixture of ammonia and combustion promoter has a calculated ratio of ammonia to combustion promoter determinable from an operating map of the engine, wherein the fuel metering module is operable to increase the ratio of ammonia to combustion promoter of the mixture with increasing engine load and decrease the ratio of ammonia to combustion promoter of the mixture with decreasing engine load to achieve substantially stoichiometric operation across the entire engine load range of the internal combustion engine;
an air metering module operable to control the mass flow rate of air into the engine; and
a spark advance module operable to control the spark advance of an ignition spark for igniting the fuel;
wherein the engine automatically switches from the single fuel mode to the dual fuel mode when an engine load corresponding to a target combustion condition is reached.

12. The internal combustion engine system of claim 11, wherein the rough limit corresponds to a coefficient of variation of a net indicated mean effective pressure of the engine of less than about 5%.

13. The internal combustion engine system of claim 11, wherein in the dual fuel mode, the spark advance module is operable to increase or hold the spark advance substantially constant as the engine load increases.

14. The internal combustion engine system of claim 11, wherein in the dual fuel mode, the fuel metering module is operable to hold the flow rate of combustion promoter substantially constant for a given RPM of the engine.

15. The internal combustion engine system of claim 14, wherein in the dual fuel mode, the fuel metering module is operable to increase the flow rate of ammonia into the engine as the engine load increases and decrease the flow rate of ammonia into the engine as the engine load decreases.

16. The internal combustion engine system of claim 11, wherein as the RPM of the engine increases when operating in the dual fuel mode, the fuel metering module is operable to decrease the ammonia to combustion promoter ratio of the mixture by increasing the flow rate of combustion promoter into the engine on a per cycle basis.

17. The internal combustion engine system of claim 11, wherein the internal combustion engine has a compression ratio between about 8:1 and about 12:1.

18. The internal combustion engine system of claim 11, wherein the difference between the engine load at which the engine operating at a first compression ratio and the rough limit switches between the single fuel mode and the dual fuel mode and the engine load at which the engine operating at a second compression different than the first compression ratio and the rough limit is less than the difference between the engine load at which the engine operating at the first compression ratio and the knock limit switches between the single fuel mode and the dual fuel mode and the engine load at which the engine operating at the second compression ratio and the knock limit switches between the single fuel mode and the dual fuel mode.

19. A method for operating a dual fueled spark ignition engine, comprising:
fueling the engine solely with a combustion promoter within a first engine load range between zero and an engine load associated with a target combustion condition selected from the group consisting of rough limit, knock limit, and any of various conditions between the rough limit and knock limit, wherein the amount of combustion promoter fueling the engine increases as the load increases within the first engine load range; and
fueling the engine on a mixture of ammonia and the combustion promoter within a second engine load range between the engine load associated with the selected target combustion condition and the engine load associated with a maximum operating pressure of the engine, wherein the amount of ammonia fueling the engine increases and the amount of combustion promoter fueling the engine remains substantially constant as the load increases within the second engine load range.

20. The method of claim 19, further comprising:
decreasing a spark advance of the engine as the load increases within the first engine load range; and
holding the spark advance of the engine substantially constant as the load increases within a substantial portion of the second engine load range.

21. The method of claim 19, wherein fueling the engine on a mixture of ammonia and the combustion promoter comprises stoichiometrically combusting the mixture of ammonia and the combustion promoter.

22. The method of claim 19, wherein the target combustion condition comprises the rough limit, and wherein the rough limit is reached at a predetermined engine load that increases as the RPM of the engine increases.

23. The method of claim 19, wherein a ratio of ammonia to combustion promoter of the mixture at the rough limit is higher than the ratio of ammonia to combustion promoter of the mixture at the knock limit.

24. The method of claim 19, wherein fueling the engine on a mixture of ammonia and the combustion promoter comprises introducing the ammonia into the engine from a first ammonia source and introducing the combustion promoter into the engine from a second combustion promoter source separate from the first ammonia source, and wherein the introduction of ammonia into the engine is separate from the introduction of the combustion promoter into the engine.

25. The method of claim 19, wherein the spark ignition engine comprises an exhaust gas oxygen sensor coupled to an exhaust system of the engine, the method further comprising:
- when the engine is operating within the first engine load range, controlling the flow rate of the combustion promoter based at least partially on input from the exhaust gas oxygen sensor; and
- when the engine is operating within the second engine load range, controlling the flow rate of the ammonia based at least partially on input from the exhaust gas oxygen sensor.

\* \* \* \* \*

UNITED STATES PATENT AND TRADEMARK OFFICE
CERTIFICATE OF CORRECTION

PATENT NO.       : 7,574,993 B2                                    Page 1 of 1
APPLICATION NO.  : 11/934651
DATED            : August 18, 2009
INVENTOR(S)      : Donald E. Gillespie et al.

It is certified that error appears in the above-identified patent and that said Letters Patent is hereby corrected as shown below:

Fig. 3
   "Instantaneuos Compression" ---should read "Instantaneous Compression"

Column 3, Line 8
   "larger the gasoline" ---should read "larger than the gasoline"

Column 6, Line 24
   "may a second" ---should read "may be a second"

Column 10, Line 45
   "not limited to, a throttle" ---should read "not limited to, throttle"

Column 13, Line 8
   "such that engine" ---should read "such that the engine"

Column 20, Lines 46-47
   "flow of rate ammonia" ---should read "flow rate of ammonia"

Signed and Sealed this

Tenth Day of November, 2009

David J. Kappos
*Director of the United States Patent and Trademark Office*